United States Patent
Christian et al.

(10) Patent No.: US 11,105,697 B2
(45) Date of Patent: Aug. 31, 2021

(54) PLATE SPRING MANOMETER

(71) Applicant: WIKA Alexander Wiegand SE & Co. KG, Klingenberg (DE)

(72) Inventors: Jeff Christian, San Antonio, TX (US); Thomas Simon, Hausen (DE); Anton Voelker, Roellbach (DE)

(73) Assignee: WIKA Alexander Wiegand SE & Co. KG, Klingenberg (DE)

( * ) Notice: Subject to any disclaimer, the term of this patent is extended or adjusted under 35 U.S.C. 154(b) by 186 days.

(21) Appl. No.: 16/531,944

(22) Filed: Aug. 5, 2019

(65) Prior Publication Data
US 2020/0041370 A1 Feb. 6, 2020

(30) Foreign Application Priority Data

Aug. 6, 2018 (DE) .................... 20 2018 003 636.6

(51) Int. Cl.
*G01L 7/08* (2006.01)
*G01L 19/14* (2006.01)
(Continued)

(52) U.S. Cl.
CPC ............. *G01L 7/084* (2013.01); *G01L 19/10* (2013.01); *G01L 19/142* (2013.01); *G01L 19/16* (2013.01)

(58) Field of Classification Search
CPC ..... G01L 19/147; G01L 9/0042; G01L 19/04; G01L 9/0054; G01L 9/0072; G01L 13/025; G01L 19/14; G01L 19/0038; G01L 19/0084; G01L 9/0055; G01L 9/0075; G01L 19/0069; G01L 9/0052; G01L 9/0073; G01L 19/0092; G01L 19/0618; G01L 19/0645; G01L 19/143; G01L 9/0051; G01L 19/0007; G01L 19/0046; G01L 19/06; G01L 19/0627; G01L 19/0681; G01L 27/002; G01L 9/00; G01L 9/0041; G01L 9/0044; G01L 11/025; G01L 11/04; G01L 19/0023; G01L 19/0672; G01L 19/069; G01L 19/142; G01L 19/145; G01L 19/16; G01L 7/00; G01L 9/0047; G01L 9/06; G01L 9/065; G01L 9/12; G01L 11/02; G01L 13/00; G01L 15/00;
(Continued)

(56) References Cited

U.S. PATENT DOCUMENTS 4,876,894 A * 10/1989 Heller ................. G01L 19/0007
                                                                      73/756
6,637,272 B1 * 10/2003 Bariere .................. G01L 7/084
                                                                      73/715
(Continued)

*Primary Examiner* — Andre J Allen
(74) *Attorney, Agent, or Firm* — Muncy, Geissler, Olds & Lowe, P.C.

(57) ABSTRACT

A measuring system for detecting pressure and/or density, having at least one process connector, a diaphragm, a measuring unit, a housing and a display, wherein a process pressure acts via the process connector on the diaphragm and the measuring unit converts a stroke of the diaphragm caused thereby into a rotational movement of a pointer when the process pressure is changed via the measuring unit, and the pointer on the display shows the pressure applied on the diaphragm on a scale. The measuring system includes a connecting piece which includes the process connector, a meter base and a tubular extension.

15 Claims, 6 Drawing Sheets

(51) Int. Cl.
*G01L 19/16* (2006.01)
*G01L 19/10* (2006.01)

(58) Field of Classification Search
CPC ... G01L 19/0015; G01L 19/003; G01L 19/02; G01L 19/0609; G01L 19/083; G01L 19/10; G01L 19/148; G01L 27/005; G01L 7/08; G01L 7/082; G01L 7/163; G01L 7/166; G01L 9/0045; G01L 9/0048; G01L 9/006; G01L 9/007; G01L 9/0076; G01L 9/04; G01L 9/045; G01L 9/125; G01L 11/00; G01L 17/00; G01L 19/00; G01L 19/0076; G01L 19/08; G01L 19/141; G01L 19/146; G01L 1/142; G01L 1/2262; G01L 1/246; G01L 21/12; G01L 23/16; G01L 27/007; G01L 7/04; G01L 7/063; G01L 7/084; G01L 7/086; G01L 7/16; G01L 9/0002; G01L 9/0007; G01L 9/0016; G01L 9/0019; G01L 9/0022; G01L 9/0027; G01L 9/0033; G01L 9/0039; G01L 9/005; G01L 9/0058; G01L 9/0077; G01L 9/0079; G01L 9/008; G01L 9/0092; G01L 9/0095; G01L 9/025; G01L 9/08; G01L 9/085; G01L 9/105; G01L 9/14; G01L 9/16
USPC .................................. 73/700–756
See application file for complete search history.

(56) References Cited

U.S. PATENT DOCUMENTS

| | | | |
|---|---|---|---|
| 2010/0201585 A1* | 8/2010 | Gawronski | G01L 19/086 343/720 |
| 2013/0098161 A1* | 4/2013 | Lee | G01L 7/163 73/744 |
| 2014/0216164 A1* | 8/2014 | Chou | G01L 7/166 73/732 |
| 2017/0059436 A1* | 3/2017 | Bauer | G01L 19/12 |

* cited by examiner

PLATE SPRING MANOMETER

CROSS REFERENCE TO RELATED APPLICATIONS

This application claims priority of Application No. 20 2018 003 636.6 filed in Germany on Aug. 6, 2018 under 35 U.S.C. § 119, the entire contents of which are hereby incorporated by reference.

BACKGROUND OF THE INVENTION

Field of the Invention

The present invention relates to a measuring system for detecting pressure and/or density.

Description of the Background Art

From the prior art, measuring systems for detecting pressure and density are generally known. The measuring systems comprise a process connector, a diaphragm, a measuring unit, a housing and a display, wherein a process pressure acts on the diaphragm via the process connector and the measuring unit converts a stroke of the diaphragm caused by said pressure into a rotary movement of a pointer when the process pressure is changed across the measuring unit. On a scale on the display, the pointer indicates the pressure applied to the diaphragm.

SUMMARY OF THE INVENTION

It is therefore an object of the present invention to provide an improved measuring system for detecting pressure and/or density over the prior art.

A measuring system for detecting pressure and/or density comprises at least one process connector, a membrane formed, for example, as a diaphragm, a measuring unit, a housing and a display. A process pressure acts on the membrane via the process connector and the measuring unit converts a stroke of the membrane caused thereby into a rotary movement of a pointer when the process pressure changes across the measuring unit. On a scale on the display, the pointer indicates the pressure applied to the membrane.

According to an exemplary embodiment of the invention, the measuring system comprises a connecting piece which includes the process connector, a meter base and a tubular extension.

For detecting a physical variable, in particular the physical variable pressure and/or density, the medium of which the physical property is to be measured is directed via the process connector, and the connecting piece is guided in the direction of a measuring space of the measuring system. The measuring space is bounded on one side by the elastic membrane. With increasing pressure, the membrane bulges and transmits a deflection to the measuring unit. A process pressure or a process temperature are hereby converted such that they can be displayed in the display.

The measuring system is particularly suitable for use in processes in which a medium must be protected from contamination. Examples of such processes can be found, for example, in the pharmaceutical, food, semiconductor and flat-panel industries. There are also many other manufacturing processes in which contamination control of the process media is desired. Furthermore, the design of the measuring system allows for use in installation situations with limited space.

The media used in the process can be liquid or gaseous media. Irrespective of the physical state, aggressive media are also possible. Regardless of whether the medium is a gaseous, aggressive gaseous, liquid or aggressive liquid medium, the membrane may not be attacked thereby and contaminate the process medium through physical or chemical reactions. Therefore, the membrane can be made of a suitable material and, for example, additionally subjected to subsequent purification. The material can be, for example, stainless steel, stainless high-grade steel or corrosion-resistant alloys, for example corrosion-resistant nickel-base alloys, such as, for example, so-called Inconel, nickel-copper alloys, for example with 65% nickel, 33% copper and 2% iron amounts, also known as Monel, and nickel-molybdenum alloys, for example, so-called Hastelloy. For purification, afterwards the component can be stained, sanded or tumbled, or subjected to a final purification. In this case, the staining in one possible embodiment can also take place only on one outer side.

The use of the measuring system in high-purity gas processes and in the food industry also places special demands on a process-facing surface. When flushing pipelines, no residue may remain, neither on the connecting piece nor the membrane of the measuring system. This is achieved in a possible embodiment of the measuring system by means of a reduced roughness of the surfaces, in particular by means of a subsequent polishing, electropolishing and/or sanding of the surfaces.

The process connector, the meter base and the tubular extension can each be manufactured as individual components and are integrally joined, for example, welded, with the connecting piece. This allows for easy production of individual components of the connecting piece and reduces complexity during manufacturing.

In order to prevent residue from remaining in the connecting piece during flushing, according to a further possible embodiment of the measuring system inner surfaces of the individual components facing the process are polished and/or electropolished and/or sanded.

Joining regions between the process connector, the meter base and the tubular extension can also be polished and/or electropolished and/or sanded.

In an embodiment of the measuring system, this has a particularly small size, which is achieved in that the inner diameter of the process connector is less than 8 mm. This results in a decrease in the dead space volume and thus in a minimization of surfaces which could be contaminated by the medium. For example, the inner diameter of the process connector on a side facing the process is 6.35 mm and an opposite side, in particular facing a meter base, is 7.75 mm.

The sealing elements common in many processes, so-called O-rings made of rubber or polyethylene cannot be used in the intended areas of application of the present measuring system due to the risk of contaminating the process media. For this reason, the process connector in a further possible embodiment of the measuring system is designed such that a connection to the process can be made, which is free of elastic seals. For this, for example, a metal-to-metal sealing contour is used which is sealingly held together by force. For this purpose, a pressure screw is for example movably mounted on a tubular portion of the connecting piece. By screwing the pressure screw into the process connector, the measuring system is form-fittingly connected to the process connector in a sealing manner. Furthermore, the measuring system is thus also mechanically held. An integrally formed pressure shoulder provided in a possible embodiment of the measuring system may in this case direct the forces of the pressure screw on the process connector, also known as a measuring connection or a gland, and thus guide the sealing contour.

An installation situation of the measuring system may stipulate that an extended process connector be required and thus the meter and the display are further away from the process. For this, measurement systems are known in which the process connector is worked out from solid material by suitable processing, such as machining. To avoid the large amount of material required, it is provided in a possible embodiment of the measuring system that, for example, a tubular extension of the process connector is created by the cohesive attaching of molded parts.

In this case, in a possible development of the measuring system the entire connecting piece has a length of 40 mm to 100 mm, in particular 50 mm to 90 mm or in particular 80 mm. A total length here is a length which extends from a lower edge of the meters base to the sealing contour. For example, the extension of the process connector has a length of 43.7 mm and the total length of the connecting piece, i.e., the length from the meter base to the sealing contour, is 88.9 mm.

In an embodiment of the measuring system, a tubular extension of the connecting piece has a sealing geometry which is coaxially and integrally formed with the pipe cross-section on the process connector. In this case, the sealing geometry may have the same outer circumference and/or inner circumference as the process connector or have a different outer circumference and/or inner circumference than the process connector. For example, it is also possible that the outer circumference is greater than an outer circumference of the process connector and that an inner circumference is the same size, or vice versa.

In an embodiment, the sealing geometry may also be formed non-coaxially to the pipe cross-section of the process connector.

In an embodiment of the measuring system, a pressure screw or a captive pressure screw or a splittable pressure screw is arranged on the connecting piece. In particular, the measuring system can be attached by means of the pressure screw to a process connector or process connecting piece. For example, the pressure screw is designed to be movable and at least substantially concentrically arranged on the process connector and presses directly on a lower shoulder or a pressure shoulder to initiate sealing forces on the process connector.

The measuring system is designed, for example, as a diaphragm pressure gauge. Pressure gauges are known from the prior art in which the diaphragm is clamped as a membrane between two flanges or is sealingly clamped. However, such a connection allows foreign substances to enter the process. In order to ensure the high purity requirements, in a possible further embodiment of the measuring system the diaphragm is firmly bonded, for example by welding with the connecting piece, in particular with the meter base and thus the measuring space. Alternatively, or additionally, a pressure ring presses edges of the diaphragm against the meter base. For example, the pressure ring additionally presses the diaphragm onto a sealing geometry and thus relieves, for example, a welded sealing zone.

In an embodiment of the measuring system, the connection between the diaphragm and the connecting piece is a leak tested connection with a leakage rate of less than $10^{-9}$ mbar*I/s. Other solutions are also possible in which a different technique is selected to establish the connection between diaphragm and connecting piece. For example, soldering, brazing, or gluing are conceivable as joining techniques to produce a particularly well-sealing connection between the connecting piece and the diaphragm.

Compared to diaphragm pressure gauges known from the prior art in which the diaphragm has a larger diameter than a dial of the pressure gauge, according to a possible further embodiment of the measurement system, a diameter of the diaphragm at least substantially corresponds to the diameter of the dial. In particular, the diameter of the diaphragm is less than 28 mm or less than 23 mm, for example 21.4 mm. The housing of the measuring system, in particular running concentrically around the diaphragm, then has for example an outer diameter of less than 40 mm or less than 30 mm. For example, the outer diameter of the housing is 33 mm or 25.4 mm.

In an embodiment of the measuring system, the deflection of the diaphragm in a measuring unit is converted such that a measured physical quantity is shown as a pointer movement or a pointer position over a dial. In one possible embodiment of the measuring system of the invention, the measuring unit or one of the measuring units are mechanical units in which the deflection of the diaphragm is converted via gear wheels and/or toothed segments into a rotary movement of a pointer.

In an embodiment of the measuring system, the diaphragm has a tappet in the middle, which is in communication with a lever-like meter.

In an embodiment of the measuring system, the latter comprises a lower unit, comprising at least one meter base and the diaphragm welded onto the latter, and an upper unit comprising at least the housing, the display and the measuring unit, wherein the upper unit and the lower unit can be coupled or are coupled by means of a screw connection.

In an embodiment of the measuring system, the lower unit and the upper unit have a mechanical measuring unit coupling, by means of which the tappet and a lever of the meter can be coupled or are coupled. Alternatively, or additionally, a diaphragm disposed between the tappet and the lever is provided for coupling the tappet and the lever; in particular, the lever of the measuring unit rests on the tappet of the diaphragm via an intermediate diaphragm.

In an embodiment of the measuring system, the lever of the measuring unit, which comes to bear on the tappet of the diaphragm, has at its end a curved shape and/or a curved section. Alternatively, or additionally, the lever of the meter has a spherical head shape. Alternatively, or additionally, the lever of the meter has a curved surface and, as a coupling element, a diaphragm.

In an embodiment of the measuring system, the lever of the measuring unit, which is movable by the tappet of the membrane, is in mechanical operative connection with an axis which is mechanically coupled to a converter lever or includes this, wherein the converter lever is designed to set a toothed segment into rotation, driving a pointer axis or pointer shaft of the display.

From the conventional art, diaphragm pressure gauges are known in which the deflection of the diaphragm is transferred to a push rod and from this push rod to a pointer mechanism. Due to the small dimension of the present measuring system, according to a possible embodiment of the measuring system, the push rod and/or the tappet have a very small height and represent in particular only a rivet-shaped coupling point for the measuring unit. For example, the diameter of the tappet or the push rod approaches the height of the tappet or the push rod.

In an embodiment of the measuring system, the tappet or the push rod transfers the deflection of the diaphragm to another, for example tongue-like shaped diaphragm. The transfer to the pointer mechanism then takes place, for example, via a spherical element resting on the diaphragm, which is fixed to a rotary shaft. If the spherical element is moved vertically, this translational movement is converted into a rotational movement of the rotary shaft. A toothed segment is in turn driven by a drive rod fixed to the rotary shaft. This toothed segment has a partially toothed contour which engages in a gear wheel. The gear wheel sits on a pointer shaft which carries a pointer and moves it over a scale.

In an embodiment of the measuring system, the display has a dial, which has a first scale above a zero point representing pressure values in units bar and/or units psi, and which has a second scale below the zero point representing pressure values in a unit different from the first scale, in particular in units inHg. Since there may be different requirements pertaining to pressures that are present within the process for different process states, a process operation and a process interruption, for example for purification, different pressure ranges can be represented in different units by means of such a divided scale so that the monitoring and reading of the values for different process conditions, the process operation and the process interruption is possible by means of the measuring system in a clear manner on a dial.

In an embodiment of the measuring system, both the measuring unit and the display are mounted in an annular housing via support members. The housing is, for example, attached to the connecting piece, for example, screwed on. The diaphragm, which for example is fixedly coupled, in particular welded, to the upper section of a sealing contour of the process connector, terminates the process connector and provides a separation from the measuring system.

Alternatively, or additionally, it is conceivable that said display or a further display is not positioned in the housing but instead is constructed as a device separate therefrom. It is conceivable for example that the display is part of a mobile terminal, such as a so-called smart phone or tablet computer or a comparable device, which is, for example, wirelessly coupled to the remaining components of the measuring system for purposes of displaying measurement values or generally for the transmission of data.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
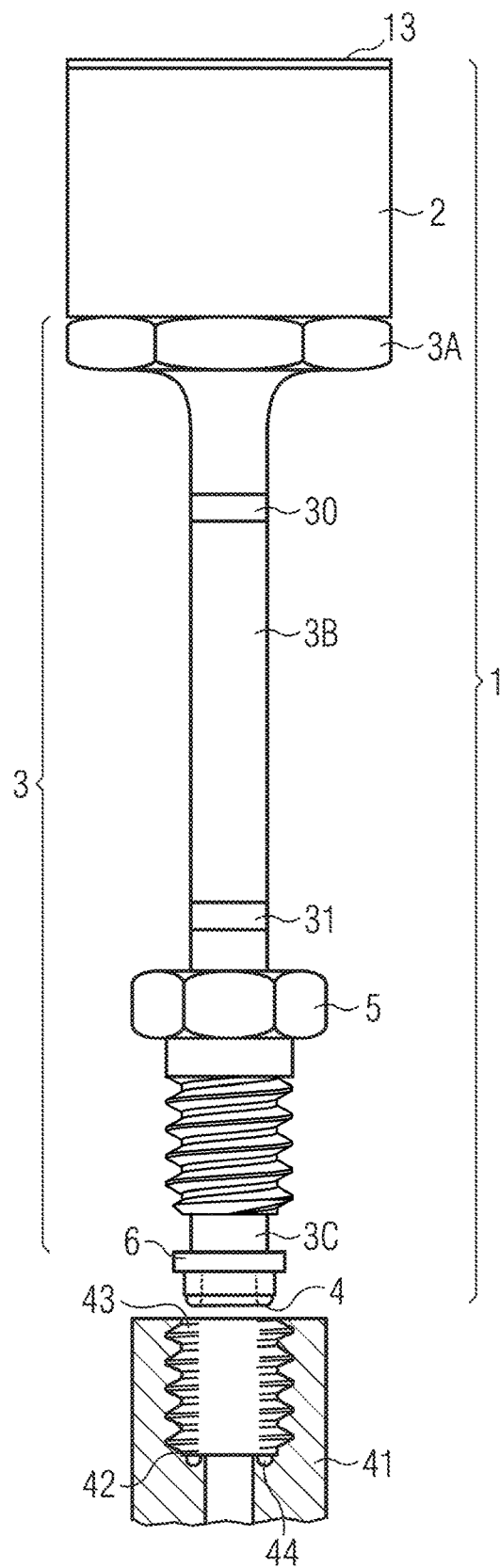
FIG. 1 illustrates a schematic external structure of a measuring system.

FIG. 1 shows the side view of a possible embodiment of a measuring system 1 for detecting pressure and/or density.

The measuring system 1 comprises a housing ring or a housing 2, a connecting piece 3, a pressure screw 5, a sealing geometry 4, a pressure shoulder 6 and a process connection 3C, also referred to as a measuring connection or gland. In particular, the process connector 3C comprises the sealing geometry 4 and the pressure shoulder 6 and sections between these.

The housing ring 2 is sealed off by means of a transparent screen 13.

The connecting piece 3 has a meter base 3A, a tubular extension 3B and the process connector 3C.

The connecting piece 3 serves to connect the measuring system 1 to a process to be measured. For example, the connecting piece 3 is made of three parts from the individual components process connector 3C, meter base 3A and tubular extension 3B, wherein the components are integrally welded to the connecting piece 3 in a special process, that is, materially connected and thus formed or joined together as one piece. In this case, even when welding from the outside, a special so-called orbital welding process results in very clean, inner welding seams 30, 31. In addition, prior to joining a diaphragm 7, these welding seams 30, 31 can also be sanded with vibratory finishing paste, cleaned or electropolished.

In the illustrated embodiment, the meter base 3A is hexagonal in shape. Other embodiments are also possible, such as embodiments in which the meter base 3A is round or square. Also possible are further embodiments with more than three edges.

The housing 2 has, for example, an outer diameter from 40 mm to 50 mm, in particular from 30 mm to 40 mm, more particularly from 28 mm to 35 mm, more particularly from 25 mm to 30 mm, and more preferably from 20 mm to 28 mm. For example, the outer diameter is less than 40 mm or less than 30 mm. In one possible embodiment, the outer diameter of the housing 2 is 33 mm or 25.4 mm.

The components of the connecting piece 3 can, as previously stated, be connected by means of the welding seams 30, 31. Here, the welding seam 30 connects the meter base 3A and the tubular extension 3B. The welding seam 31 joins the tubular extension 3B and the process connector 3C.

The roughness of the welding seams 38, 31 is optionally reduced from the inside by sanding, electropolishing and subsequent washing. Also, the welding seams 30, 31 can be untreated on the inside and stained electrolytically on the outside.

The process connector 3C is sealed off by a sealing geometry 4. The pressure screw 5 is disposed to be movable and essentially concentric on the process connector 3C and presses directly on a lower shoulder or a pressure shoulder 6 in order to initiate sealing forces on the process connector 3C. The sealing geometry 4 is arranged at the process-facing end of the process connector 3C. The substantially annular pressure shoulder 6 is located above a process-facing end of the sealing geometry 4.

In the lower part of FIG. 1, a process connecting piece 41 is shown, which is formed for the connection of the measuring system 1 to a process to be measured. The process connecting piece 41 comprises, for example, a thread 43 via which the measuring system 1 can be coupled. Further, for example, a geometry 42 may be provided on the process connecting piece 41, into which the process connector 3C of the measuring system 1 can be inserted for sealing and/or positioning a connection of the respective components. For example, a semicircular sealing geometry 44 may be incorporated in the base of the geometry 42. But this can also be realized by a flat contour or by means of a metallic sealing washer or disc seal. In any case, the sealing geometry 4 of the measuring connection 3C is a sealing geometry, in particular a metal-sealing geometry.

Figure 2:
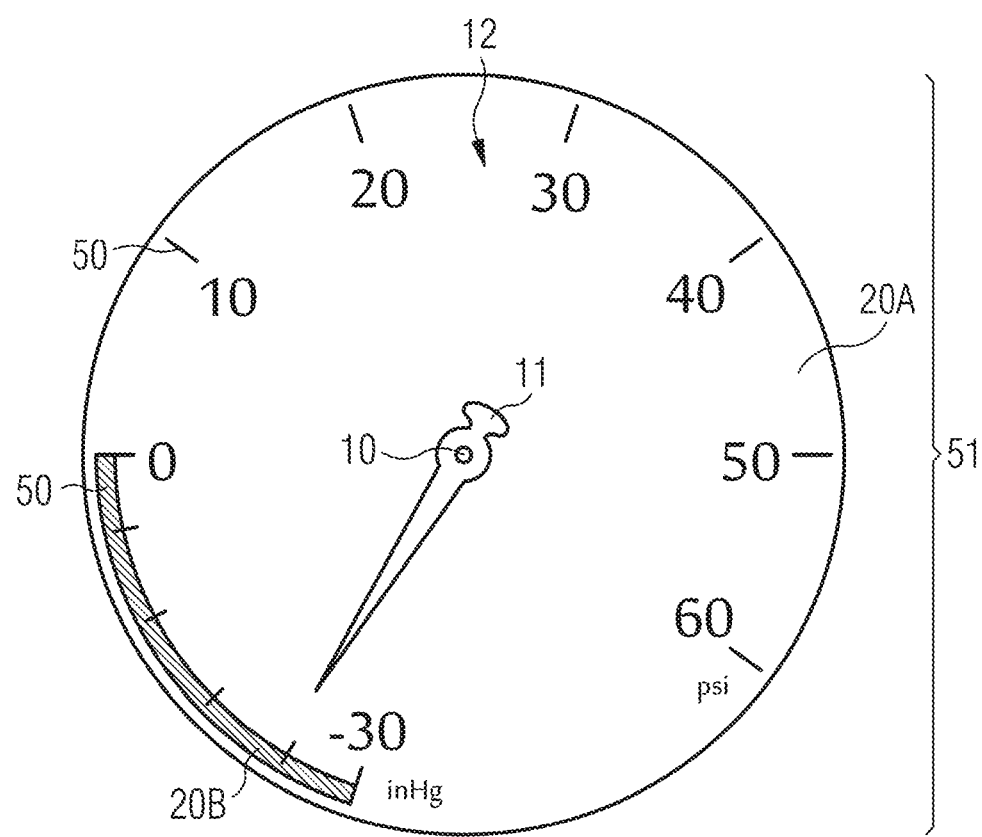
FIG. 2 illustrates a schematic display of a measuring system.

FIG. 2 shows a view of a possible embodiment of a display 51 of a measuring system 1. The display 51 comprises a dial 12, which is equipped with a scale 5.

In the illustrated embodiment, the scale 50 is divided into a positive scale 50A and a negative scale 50B. In the embodiment, a range of 0 psi to 60 psi was selected for the positive scale 50A. However, other embodiments are also possible, for example, a measuring range from 0 psi to 90 psi or a measuring range from 0 psi to 120 psi or a version in units "bar". Other measuring ranges and physical units are also conceivable, for example Pa, at, atm, Torr, cmH$_2$O, inHg (inch Hg), mTorr, inH$_2$O or ftH$_2$O.

In the illustrated exemplary embodiment, a measuring range from 0 inHg to −30 inHg was selected for the negative scale 50B. However, other embodiments are also possible, for example a measuring range from 0 psi to +130 psi or a measuring range from 0 psi to +120 psi. Other physical units are also conceivable for the negative scale, such as Pa, bar, psi, at, atm, torr, cmH$_2$O, mTorr, inH$_2$O or ftH$_2$O.

A pointer 11 is hereby preferably mounted in the middle of the dial 12 on a pointer shaft 10. Also conceivable is a pivot point of the pointer shaft 10 in the lower region of the dial 12. In the illustrated embodiment, the pointer 11 is designed in Dauphine style with a counterweight. However, other pointer geometries as well as pointers 11 without counterweight are also possible. In these compact designs, the counterweight of the pointer 11 can be dispensed with in order to avoid obscuring important imprints and information of the dial 12.

Figure 3:
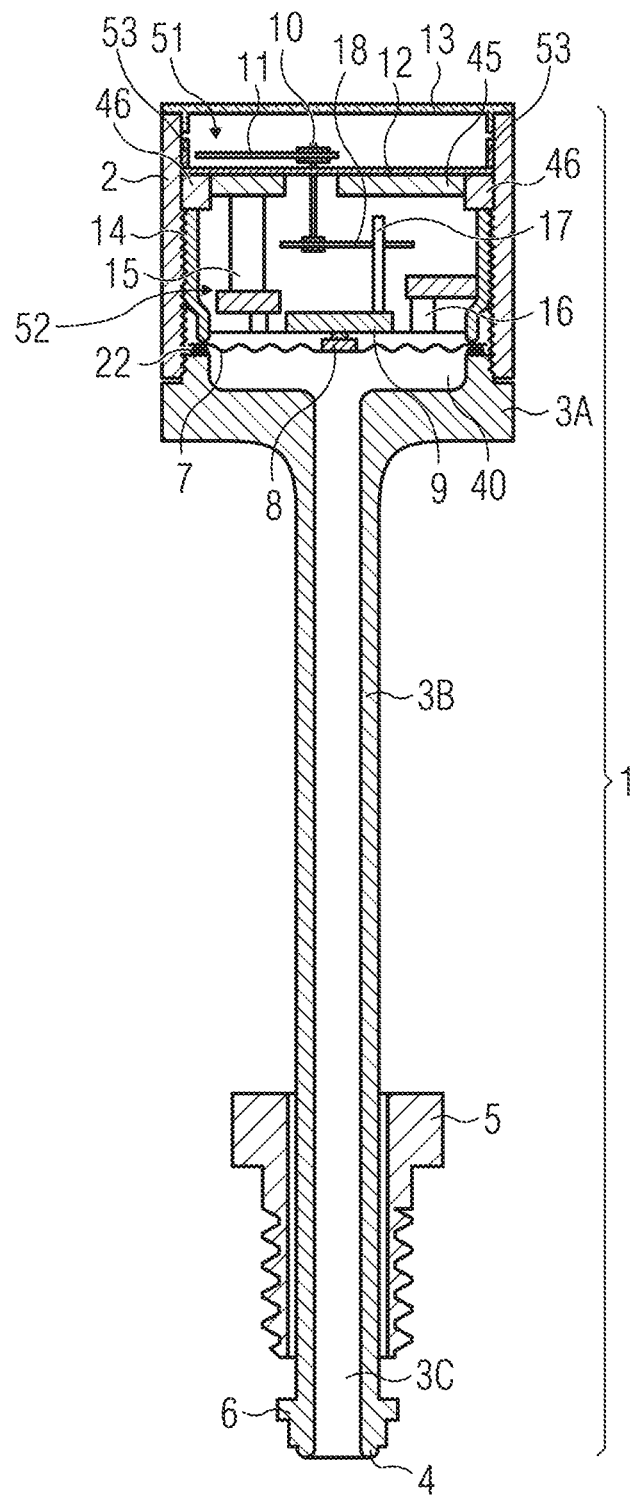
FIG. 3 illustrates a schematic cross section of a measuring system.

FIG. 3 shows a sectional view of a possible embodiment of a measuring system 1. The measuring system 1 includes a display 51, a diaphragm 7 with a coupled measuring unit 52 and the connecting piece 1 with a process connector 3C.

The display 51 includes the dial 12, the pointer 11 and is sealed off to the outside by means of the transparent screen 13. The measuring unit 52 is coupled to the diaphragm 7 via a push rod or a tappet 8.

In this case, then, as shown in the following figures, the stroke of the diaphragm 7 is amplified via a mechanism according to the lever law. Among other things, in this case a drive rod 17 presses against a toothed segment 18, which is in engagement with a gear wheel 19 of the pointer shaft 10 shown in FIGS. 4 and 5. In this case, another transmission of a push rod movement takes place, but it is simultaneously converted into a rotary motion.

On average, several carrier elements 15, 16 are shown, which bear a rotary shaft 9, the toothed segment 18 and the pointer shaft 10 and fasten these to the housing 2. An additional pressure ring 14 additionally presses the membrane formed as a diaphragm 7 onto a welding-sealing geometry 22, thus relieving a welded sealing zone. On the pressure ring 14 are a fixing ring 46 and optionally a Hauptwerk circuit board 45 which support the dial 12.

The dial 12 is held from the outside by means of a further fixing ring 53. This is then adjoined by the transparent screen 13.

The meter base 3A may form the connection from a connecting tube or from the tubular extension 3B to a measuring chamber or measuring space 40 of the measuring system 1. The meter base 3A may include the welding-sealing geometry 22, which is sealed off via clamping and/or welding by the diaphragm 7 of the measuring system 1. The diaphragm 7 can be connected to the meter base 3A via the welding-sealing geometry 22.

A process pressure to be measured can act on the diaphragm 7 via the process connector 3C. A stroke of the diaphragm 7 caused thereby can be converted into a rotational movement of the pointer 11 via a measuring unit 52 when changing the measured process pressure. Here, the pointer 11 of the display 51 indicates on a scale 12 the pressure applied on the diaphragm 7.

The meter base 3A may further be considered, for example, as part of the housing 2 and/or as molded parts of the housing 2. The meter base 3A may further include threaded sections for receiving the housing ring or the housing 2 and/or tool engagement surfaces for mounting the measuring system 1.

The sealing geometry 4, the pressure screw 5 and the process connector 3C, which includes the pressure shoulder 6 and the sealing geometry 4, may be formed as described above in reference to FIG. 1. In particular, the measuring system 1 can be fastened by means of the pressure screw 5 to a process connector or a process connecting piece 41.

Figure 4:
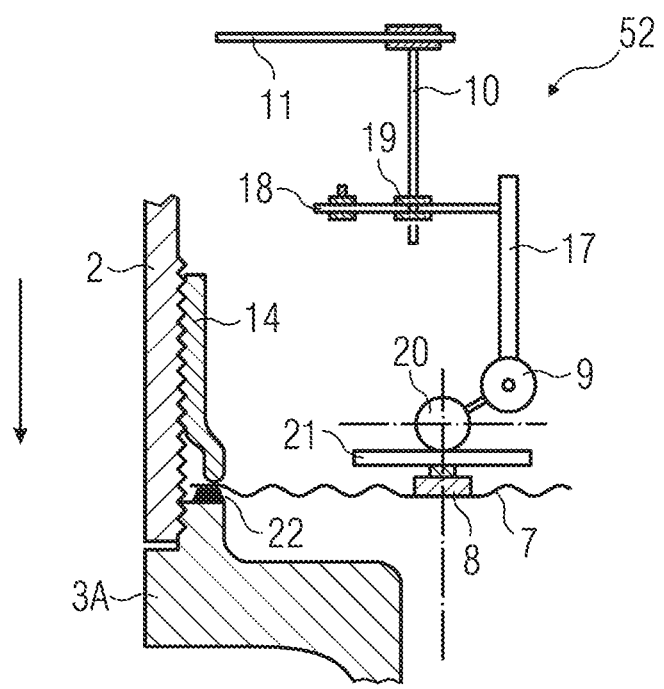
FIG. 4 illustrates a schematic connection between a connecting piece and a housing of a measuring unit and a display unit of a measuring system.

FIG. 4 is a sectional view of a possible embodiment of a connection between the housing 2 or the housing ring of the measuring unit 52, the diaphragm 7 and the pressure ring 14. The housing 2 is connected by means of a screw with the meter base 3A. The pressure ring 14 is fixed within the housing 2 by a screw. Said ring presses on the edges of the diaphragm 7.

According to the arrow, the gap shown in FIG. 4 between the pressure ring 14 and the diaphragm 7 is thereby closed by screwing in the pressure ring 14, so that in a position not shown in FIG. 4 the pressure ring 14 rests on the diaphragm 7 and presses on it. The tightening of the pressure ring 14 can occur in particular with a defined torque. This makes it possible in an advantageous way to close a welding seam between the diaphragm 7 and the meter base 3A or to maintain it more gas-tight. The tappet 8 is also attached at least substantially in the middle of a side of the diaphragm 7 facing away from the process.

The measuring unit 52 is coupled to the diaphragm 7 via a push rod and/or the tappet 8, which acts on a lever 20 via a leaf spring 21. The tappet 8 may be indirectly or directly coupled to the diaphragm 7, in particular welded. The lever 20 shown in FIG. 4 hinges the rotary shaft 9, which carries a drive rod 17.

The drive rod 17 presses against the toothed segment 18 which is engaged with the gear wheel 19 of the pointer shaft 10 shown in FIGS. 4 and 5. The pointer shaft 10 subsequently transmits its rotary motion to the pointer 11.

FIG. 5 A shows a schematic representation of a possible embodiment of the measuring unit 52.

Upon deformation of the diaphragm 7, the tappet 8 is also moved vertically. This movement is transferred to the leaf spring 21. The lever 20 resting on the leaf spring 21 is attached to the rotary shaft 9. If the movement of the tappet 8 is transferred to the lever 20 by means of the leaf spring 21, then the drive rod 17 attached thereto is moved by means of the rotary shaft 9. The drive rod 17 moves the toothed segment 18 at an engagement point. The toothed segment 18 moves the gear wheel 19. The pointer shaft 10 is preferably mounted concentrically on the gear wheel 19. The pointer 11 is fixed on the pointer shaft 10.

Figure 5A:
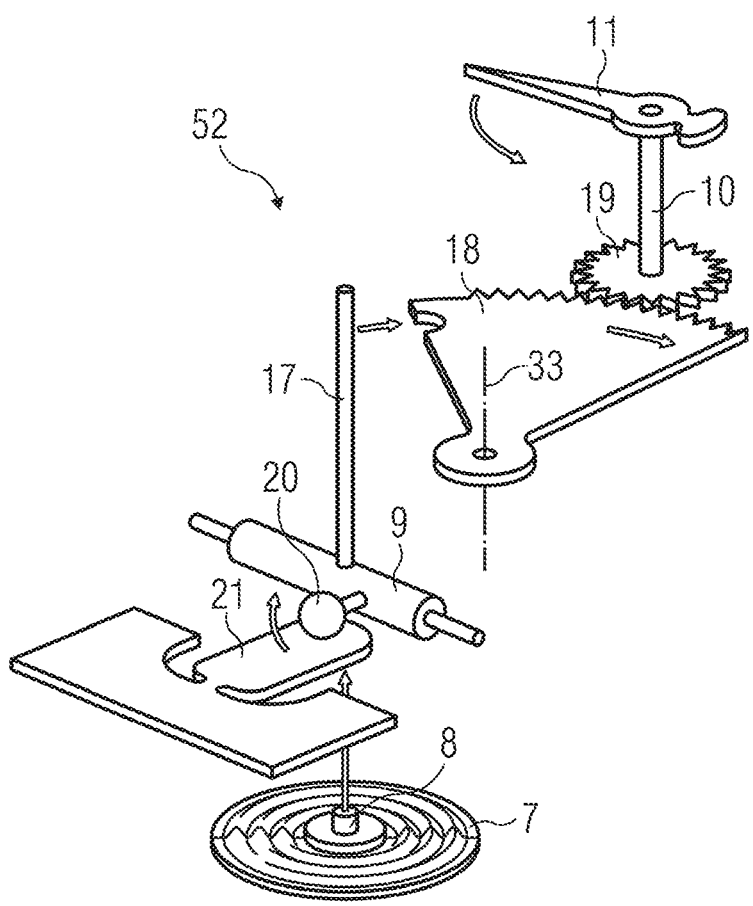
FIGS. 5A and 5B illustrate a schematic structure of a pointer mechanism of a measuring system.

The leaf spring 21 may be configured to allow for coupling between the lever 20 and the tappet 8 in different positions of the lever 20 with respect to the tappet 8. For this purpose, the leaf spring 21, as shown in FIG. 5A, may be arranged between the tappet 8 and the lever 20. The leaf spring 21 can be deformed by the action of the tappet 8 on the leaf spring 21 while the latter moves the lever 20 in the direction of movement of the tappet 8. During the movement of the lever 20, the leaf spring 21 may be permanently or at least sectionally in contact with both the tappet 8 and the lever 20 and thus enable a continuous transmission of movement between tappet 8 and lever 20.

Alternatively, or additionally, the leaf spring 21 and/or a further spring can be formed such that it/they hold the pointer 11 in a defined position of rest or that it/they exert a resetting force on the pointer 11, in particular when the measuring system 1 is not pressurized or when the measuring system 1 is subjected to a predetermined pressure, for example atmospheric pressure.

Figure 5B:
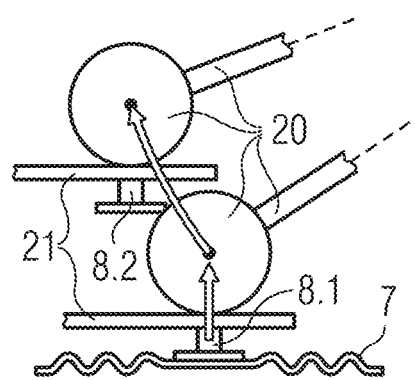

FIG. 5B illustrates the operation of the leaf spring 21. The leaf spring 21 is shown here in two different positions.

In the lower part of FIG. 5B, the diaphragm 7 is in a first position, in which the measuring system 1 is subjected to, for example, a low pressure. The lever 20 shows a small deflection and the tappet 8 is centrally located below the spherical head of the lever 20.

In the upper part of FIG. 5B, the diaphragm 7 has moved upwards, for example, because of a change in pressure, and thereby entrained both the leaf spring 21 and the lever 20. The tappet 8 is no longer centrally below the spherical head of the lever 20, since the tappet can indeed move in the axial direction, but hardly in the radial direction relative to the leaf spring 21.

Without the leaf spring 21, an error in the transmission of movement between the tappet 8 and the lever 20 could occur.

FIGS. 6A, 6B, 6C, 6D, and 6E schematically show possible embodiments of the lever 20.

In FIGS. 6A to 6D, the diaphragm 7, the rotary shaft 9 and the drive rod 17 function as described further above in connection with FIGS. 3, 4 and 5A, wherein the rotary shaft 9 is set into rotary motion by the lever 20, and this rotational movement is transmitted via the drive rod 17 to the toothed segment 18.

The reference numerals 20a, 20b, 20c, 20d and 20 may refer to levers which may differ in terms of their design, but which correspond to each other in terms of their functionality.

Figure 6A:
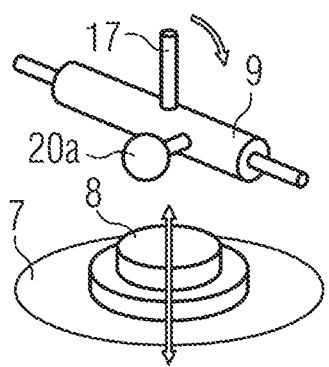
FIG. 6A to 6E illustrate a schematic of a lever of a measuring unit of a measuring system.
Figure 6B:
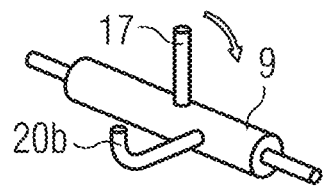
Figure 6C:
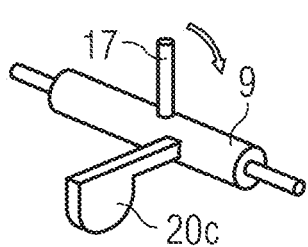
Figure 6D:
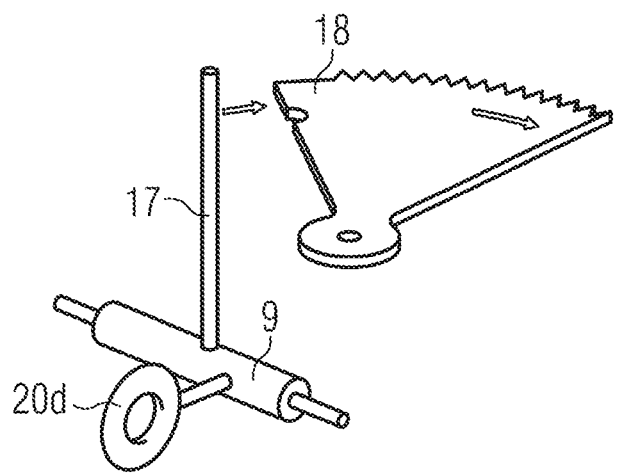
Figure 6E:
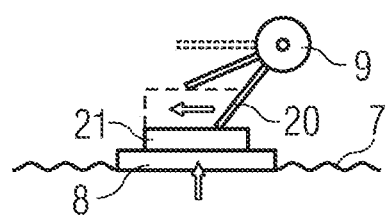

In FIG. 6E, the lever 20a is designed with an at least substantially spherical head. Furthermore, the tappet 8 has a larger diameter than the embodiments shown in the previous figures. In this embodiment, the leaf spring 21 described above can be omitted since the tappet 8 is dimensioned sufficiently large to always remain in contact along its entire axial movement with the central lower part of the spherical head of the lever 20a rotating thereby. The term central lower part of the lever 20a, as previously, always refers to the lower part of the head of the lever 20a in the figures.

In FIG. 6B, the lever 20b is designed at least substantially as an arcuate, curved hook.

In FIG. 6C, the lever 20c is at least substantially semi-circular.

In FIG. 6D, the head of the lever 20d is at least substantially annular or toroidal or donut-shaped.

In FIG. 6E, the head of the lever 20 is at least substantially designed as a rotatably movable component which can slide along the leaf spring 21 during axial movement of the tappet 8. The dashed and solid lines show the lever 20 and a part of the leaf spring 21 in different positions.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A measuring system for detecting pressure and/or density, the measuring system comprising:
   a process connector;
   a diaphragm;
   a measuring unit;
   a housing;
   a display; and
   a connecting piece, which comprises the process connector, a meter base and a tubular extension,
   wherein a process pressure acts on the diaphragm via the process connector and the measuring unit converts a stroke of the diaphragm into a rotational movement of a pointer when the process pressure changes,
   wherein the pointer is provided on the display and indicates, on a scale of the display, the pressure applied to the diaphragm, and
   wherein a pressure ring presses edges of the diaphragm against the meter base, such that the pressure ring contacts a first surface of the diaphragm and the meter base contacts a second surface of the diaphragm that opposes the first surface to sandwich the edges of the diaphragm between the pressure ring and the meter base.

2. The measuring system according to claim 1, wherein the process connector, the meter base and the tubular extension are each made as individual components and are joined together in one piece to form the connecting piece and/or inner surfaces of the connecting piece facing a process are polished and/or electropolished and/or sanded and/or joining areas between the process connector, the meter base and the tubular extension are polished and/or electropolished and/or sanded.

3. The measuring system according to claim 1, wherein the process connector has a sealing geometry.

4. The measuring system according to claim 1, wherein the connecting piece has a length of 40 mm to 100 mm, 50 mm to 90 mm or 80 mm.

5. The measuring system according to claim 1, wherein a pressure screw or a captive pressure screw or a dividable pressure screw is arranged on the connecting piece.

6. The measuring system according to claim 1, wherein the diaphragm has a diameter of less than 28 mm or less than 23 mm and/or the housing has an outer diameter of less than 40 mm or less than 30 mm.

7. The measuring system according to claim 1, wherein the display has a dial, which has a first scale above a zero point, which represents pressure values in units bar and/or units psi and the dial has a second scale below the zero point, which represents the pressure values in a unit other than the first scale.

8. The measuring system according to claim 1, wherein the diaphragm is formed from corrosion-resistant material or a corrosion-resistant nickel-based alloy.

9. The measuring system according to claim 1, wherein center of the diaphragm has a tappet which is connected with the measuring unit.

10. A measuring system for detecting pressure and/or density, the measuring system comprising:
- a process connector;
- a diaphragm;
- a measuring unit;
- a housing;
- a display;
- a connecting piece, which comprises the process connector, a meter base and a tubular extension;
- a lower unit comprising the meter base and the diaphragm welded onto the meter base, and an upper unit comprising at least the housing, the display and the measuring unit, wherein the upper unit and the lower unit are coupled via a screw connection,
- wherein a process pressure acts on the diaphragm via the process connector and the measuring unit converts a stroke of the diaphragm into a rotational movement of a pointer when the process pressure changes, and
- wherein the pointer is provided on the display and indicates, on a scale of the display, the pressure applied to the diaphragm.

11. The measuring system according to claim 10, wherein the lower unit and the upper unit have a mechanical measuring unit coupling, wherein via the measuring unit coupling, a tappet and a lever of the measuring unit are coupled and/or a leaf spring for coupling the tappet and the lever and being arranged between the tappet and the lever is provided, or the lever of the measuring unit rests on the tappet of the diaphragm via an interposed leaf spring.

12. The measuring system according to claim 11, wherein the lever of the measuring unit, which comes to bear with the tappet of the diaphragm, has a curved shape at an end thereof and/or a curved portion and/or has a spherical head shape and/or has a curved surface and has a leaf spring as a coupling element.

13. The measuring system according to claim 11, wherein the lever of the measuring unit, which is movable by the tappet of the diaphragm, is in mechanical operative connection with an axis, which is mechanically coupled to a converter lever or comprising the latter, wherein the converter lever is formed to set a toothed segment into rotation, which drives a pointer shaft of the display.

14. The measuring system according to claim 7, wherein the unit of the second scale is inHg.

15. The measuring system according to claim 1, wherein the pressure ring is connected to an inner surface of the housing via a screw connection.

* * * * *